UNITED STATES PATENT OFFICE.

HENRY C. DART, OF NEW YORK, N. Y.

MANUFACTURE OF SELF-RAISING FLOUR.

SPECIFICATION forming part of Letters Patent No. 224,998, dated March 2, 1880.

Application filed April 22, 1879.

*To all whom it may concern:*

Be it known that I, HENRY C. DART, of the city and State of New York, have invented a new and useful Improvement in Self-Raising Flour, of which the following is a specification.

This invention is based on my discovery that a fine flour or meal of oats possessing the peculiar advantageous characteristics of this cereal can be adapted for use in a self-raising flour for pancakes by mixture with the flour of southern corn or maize and that of wheat, or with either of the latter separately.

The object of the invention is to so utilize oats or oatmeal in the production of a novel article of food adapted to be used as a substitute for buckwheat-flour, and more palatable and wholesome than the latter.

I make use of one part of oats, two parts of southern corn or maize, and two and one-quarter parts of wheat. These are separately ground to flour of uniform, or nearly uniform, fineness, and afterward steam-cooked, dried, and thoroughly mixed together.

I prefer to use both wheat-flour and corn-flour in combination with the flour of oats; but either may be used alone with good effect, and the proportions of the ingredients may be varied somewhat without material change.

It is preferable that the ground flour or meal should be steam-cooked before mixing; but it is not essential that it should be so cooked. To the above mixture may be added any preferred baking-powder, in suitable quantity to make the compound flour self-raising; or there may be added to every five hundred and twenty-five pounds of the compound seven and one-half pounds of soda, seven and one-half pounds of salt, and fifteen pounds of cream of tartar, which I prefer for a self-raising compound.

The oatmeal, or flour of oats intermixed, as aforesaid, partakes of the leavening effects of the yeast-powder or its equivalent, and cooks with the requisite rapidity in the pan or griddle, for which the compound flour is prepared the same as other self-raising flour. The compound is, moreover, a most nutritious and healthy food.

I am aware that Patent No. 176,092 describes a food compound containing prepared groats, seconds-flour, and maize, in connection with other flours and meals and certain mineral salts, to wit, calcium carbonate and chloride of sodium; and I hereby disclaim the combination of the flour or meal of oats with other flours and meals and mineral salts, broadly considered, limiting myself to my self-raising flour hereinbefore specified, which is adapted to be cooked on the griddle or in a pan, as a superior substitute for buckwheat-flour, as aforesaid, while said food compound is not adapted to be so used.

I claim—

The combination, in a self-raising pancake-flour, of finely-ground oatmeal and the flour or meal of other grain, as herein specified, in about the proportion of one hundred parts of the former to four hundred and twenty-five parts of the latter, with a leavening-powder.

HENRY C. DART.

Witnesses:
HOWARD F. STREVER,
J. GUY TIMOLAT.